Figure 1:
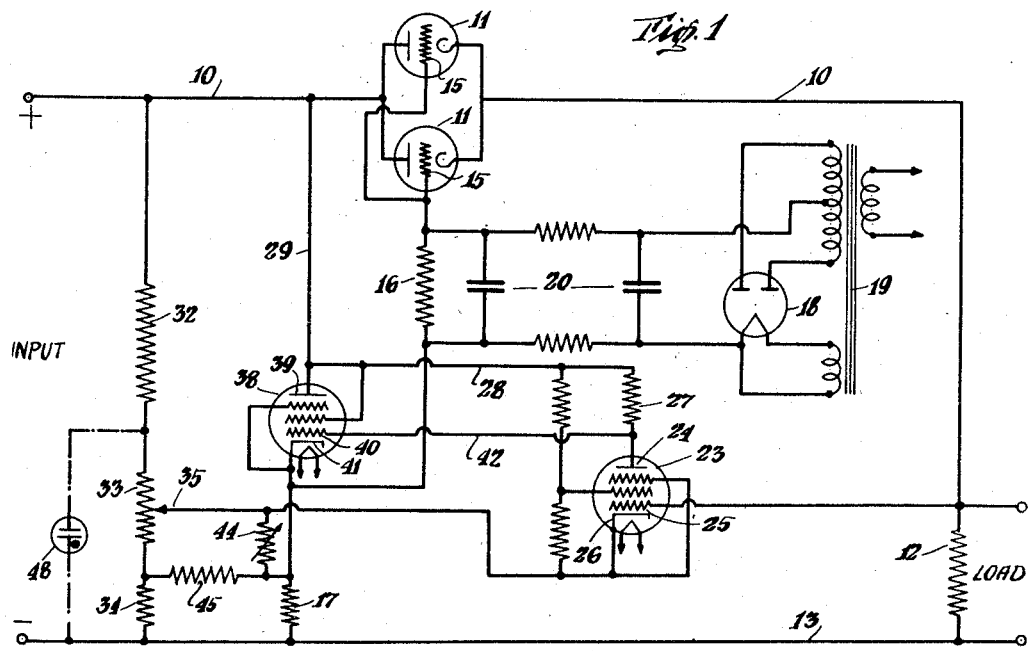

Oct. 11, 1949.   L. P. PARADISE ET AL   2,484,724
VOLTAGE REGULATOR WITH SECONDARY
SOURCE OF POTENTIAL
Filed Aug. 1, 1944

INVENTORS
Lionel P. Paradise
BY Werner T. Auerbacher

Bohleber, Fassett & Montstream
ATTORNEYS

Patented Oct. 11, 1949

2,484,724

UNITED STATES PATENT OFFICE 2,484,724

VOLTAGE REGULATOR WITH SECONDARY SOURCE OF POTENTIAL

Lionel P. Paradise, New York, and Werner F. Auerbacher, Brooklyn, N. Y., assignors to Radio-Television Institute, Inc., New York, N. Y., a corporation of New York Application August 1, 1944, Serial No. 547,600

20 Claims. (Cl. 323—22)

The invention relates to a voltage regulator circuit which accurately maintains the voltage applied to a load. It is adapted to be inserted between a source of D. C. potential, such as a rectifier and a smoothing filter, and a load. There are many loads which require the continuous and accurate maintenance of the voltage applied thereto irrespective of variations in line voltage and changes or variations in the load.

The invention also relates to a D. C. regenerative feedback amplifier which is particularly suited for use with the voltage regulator but which also has application in other circuits.

In order to get voltage regulation through a wide range of voltages down to zero volts at the load, it is necessary that the control grid or grids of the discharge tube or tubes forming the regulating means which primarily controls the voltage, be supplied with an adequate negative bias or a voltage lower than that of the neutral. This bias for the control grid of the regulating means is obtained from a secondary or auxiliary source of D. C. potential such as a separate transformer, rectifier and filter means. Heretofore, the internal capacity of the secondary winding of the transformer of such secondary power supply has been essentially isolated from or had a high impedance connection with neutral or ground because the transformer was connected into the plate circuit of a tube, with the result that this internal capacitance of the transformer, which are of considerable magnitude and of an unbalanced character, acted as an A. C. generator and created a hum within the circuit. In the circuit herein the secondary or auxiliary voltage supply is connected with neutral through a low impedance or is directly connected with the neutral so that the capacity in the secondary winding of the power transformer is effectively shunted by a low impedance. Therefore any A. C. injected into the circuit from this source is reduced to a minimum.

It is an object of the invention to construct a voltage regulator circuit having a secondary or auxiliary power supply for providing a negative bias for the control grids of the regulatory means or tubes but with the secondary power supply inserted at a point where the capacity of the secondary winding of the power transformer is shunted to ground either directly or by a low impedance.

Another object of the invention is to construct a voltage regulator circuit providing D. C. regenerative feedback whereby the amplification of the signal or voltage variations are increased.

Another object of the invention is to construct a voltage regulator circuit having a secondary or auxiliary source of power supply to provide negative bias for the regulating means or tubes and which also provides D. C. regenerative feedback whereby amplification of the voltage variations are substantially increased.

Other objects of the invention will be more apparent from the following description taken in connnection with the accompanying drawings illustrating preferred embodiments of the invention, in which Figure 1 is a diagrammatic view of a voltage regulator circuit with the secondary winding of the auxiliary power supply connected through a low impedance to neutral and with a D. C. regenerative feedback network.

Figure 2:
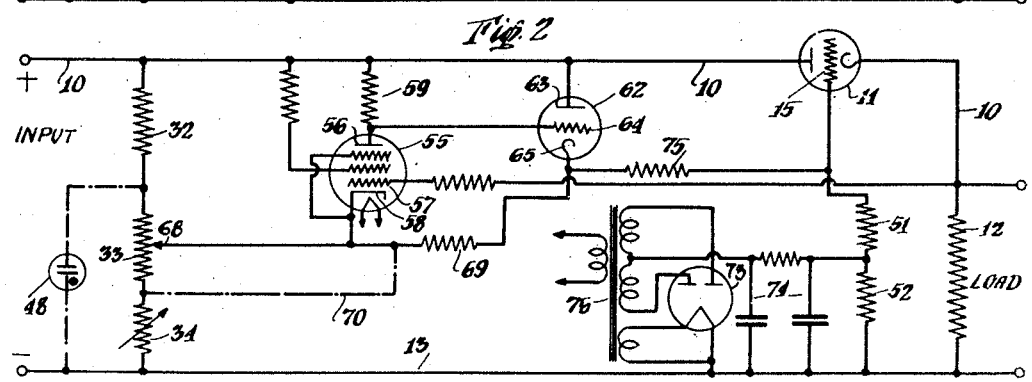

Figure 2 is a diagrammatic view of a voltage regulator circuit in which the secondary winding of the auxiliary power supply is directly connected with neutral.

The voltage regulators of Figures 1 and 2 are intended primarily for connection in or substitution for the second stage of the voltage regulator described in our Patent 2,401,096. In such a two-stage circuit the A. C. ripple is substantially removed in the first stage. The circuit to be described herein, however, is equally applicable for use as a single stage voltage regulator as will appear more fully hereinafter.

The voltage regulator circuit includes a load line 10 the input side of which is connected with any suitable source of D. C. potential such as a transformer, rectifier and filter circuit and a first stage of regulation. Voltage regulating means is connected in the load line or circuit 10 which may be a single regulating electron discharge tube 11 or a plurality of tubes connected in parallel. Any number of tubes may be used depending upon the current desired to be supplied to the load. A bleeder resistor 12 preferably is connected between the load line 10 and the neutral line 13 across the load. The control grid or grids 15 of the regulating tubes 11 are connected through impedance means including resistors 16 and 17 with neutral 13.

A secondary or auxiliary source of D. C. potential is connected across the impedance means or preferably across a portion thereof, or particularly across the resistor 16 as shown in Figure 1 for supplying an adequate negative bias to the control grid. The negative bias supplied is a potential lower than neutral where the regulating circuit is intended to control load voltages down to zero potential. This secondary source of D. C.

potential may be of any suitable kind, that illustrated being a full wave rectifier 18 connected with a source of A. C. supply through a transformer 19. The output of the rectifier is smoothed by a filter 20 of any desired form that is shown including resistances with condensers in shunt therewith. The full wave rectifier and filter per se are well known and need not be further described. This secondary source of power supply is connected with the resistor 16 in such manner that a negative bias is supplied to the control grid 15. It will be observed that the secondary winding of the transformer 19 is connected with neutral or ground 13 through a low impedance 17 and consequently any A. C. voltage which may appear within the transformer as a consequence of the capacities therein are connected to ground through a low impedance and thereby effectively shunts the transformer capacities. Any A. C. injected into the circuit is thereby reduced to a minimum.

The control grid or grids 15 of the voltage regulating means or tubes 11 is controlled by a control circuit which amplifies the signal or voltage variations across the load and varies the control grid potential in a sense or direction opposite from the variations in the voltage across the load or on the output side of the load circuit 10. The control circuit includes an amplifying electron discharge tube 23, having a plate 24, control grid 25, and cathode 26. The amplifier may be a pentode tube having a suppressor grid and a screen grid with their usual connections. The plate is connected to a source of D. C. supply such as the load line through a load resistor 27 and the wires 28 and 29. The connection preferably is with the input side of the load circuit.

The control means also includes means to present the amplified variations in the load voltage to the control grids 15 of the regulating means in the opposite sense or direction. This means includes a cathode follower electron discharge tube 38, having a plate 39, control grid 40 and cathode 41. The control grid 40 is connected with the plate 24 of the amplifier tube 23 through wire 42 and the plate 39 is directly connected with a source of D. C. potential or particularly with the load circuit. The tube shown has a screen grid connected to the plate and a suppressor grid connected with the cathode.

The cathodes 26 and 41 of the two tubes 23 and 38 are connected with neutral through any suitable impedance means. The cathode 26 is connected with neutral through a voltage divider including resistors 32, 33 and 34 connected in series and connected between the input side of the load circuit 10 and neutral 13. This cathode connection with the voltage divider is between the ends thereof and preferably has an adjustable contact 35 to adjust the potential of the cathode. The cathode 41 is also connected to neutral through a portion of the resistance connected with the control grids 15 of the regulating tubes 11. More particularly the cathode 41 is connected between the resistors 16 and 17 so that the latter serves also as a cathode resistor.

The voltage regulator circuit illustrated has a D. C. regenerative feedback to increase the amplification of the control means or amplifier tube and thereby increase the effectiveness of the regulating circuit. This D. C. feedback circuit includes primarily a resistor 44 connecting together the cathodes of the amplifier tube 23 and of the cathode follower tube 38. It may also include the resistor 45 which connects the cathode 41 with the voltage divider at a point between the potentiometer 33 and resistor 34 or at a point of lower potential than the point of connection of the cathode 41 with the voltage divider. The latter resistor stabilizes the feedback throughout the range, the amount of feedback being adjustable through the potentiometer 44.

The voltage regulating circuit operates in the following manner. If the voltage across the load should drop the control grid 25 of the amplifier tube 23 which is connected therewith would become more negative with respect to its cathode thereby reducing the current flow through the amplifier tube. The potential of the plate 24 would rise, which would also raise the potential on the control grid 40 of the tube 38, which would result in an increased current through this tube and through the resistor 17 of the impedance means connecting the control grid 15 with neutral. The potential across the resistor 17 increases which increases the potential upon the control grid 15 of the regulating means or tubes. As previously explained, the auxiliary power supply provides a negative bias to the control grids 15 by virtue of the potential supplied across the resistor 16. The control grids 15 become more positive which reduces the impedance across the regulating tubes and increases the voltage on the output side of the load circuit 10. An increase in potential across the load for any reason has the reverse effect of lowering the potential on the control grid 15 of the regulating tubes 11, which increases the impedance of the regulator tubes 11 and decreases the potential of the output side of the load circuit 10.

It has previously been mentioned that D. C. regenerative feedback may be supplied with the amplifier of the regulating circuit. This feedback circuit operates in the following manner. Suppose that the voltage across the load should drop which lowers the voltage of the control grid 25 with respect to its cathode 26, so that less current flows through the amplifier tube. This in turn raises the potential upon the control grid 40 so that more current flows through the tube 38 and its cathode resistor 17, which increased current raises the potential across this resistor. By virtue of the connection 44 any increase in the potential drop across the resistor 17 raises the potential of the cathode 26 of the amplifier tube 23 which has the effect of increasing the negative bias of this tube, which in turn decreases the current further so that the plate potential increases further and likewise the potential of the control grid 40 with respect to its cathode so that a further increase in current takes place through the tube 38 and the cathode resistor 17. In this manner D. C. regenerative feedback takes place which substantially increases the grain or amplification of the amplifier tube. The amount of regenerative feedback may be adjusted by adjusting the variable resistor 44.

The regulator circuit illustrated in Fig. 1 and described hereinbefore is constructed particularly for use in the second stage of applicants' earlier application. This regulator circuit, however, may be used as a single stage regulating circuit, in which case a voltage stabilizing means, such as a gas tube 48, may be connected across the resistors 33 and 34 of the voltage divider. With this gas tube so connected the regulating circuit of Figure 1 may be connected with a D. C. supply such as a transformer, full wave rectifier and filter means of known construction.

Figure 2 illustrates a voltage regulator circuit in which the secondary or auxiliary power supply is connected directly with ground or neutral. In this construction similar parts are designated with the same numerals as shown in Figure 1 and need not be again described. The regulating tube 11 in the load circuit 10 has its control grid 15 connected with neutral 13 through impedance means which includes resistors 51 and 52.

A control circuit is provided for controlling the control grid 15 of the regulating means to compensate for variations in potential at the load which control circuit amplifies these voltage variations and presents them in a negative or opposite sense to the control grid 15 of the regulator tube 11. The control circuit includes an amplifier tube 55, shown as a pentode, having a plate 56, control grid 57 and cathode 58. The plate 56 is connected through a resistor 59 to a source of D. C. potential which is shown as the input side of the load line 10.

A cathode follower tube 62 has a plate 63, control grid 64 and cathode 65, the plate of which is connected with a source of D. C. potential such as the input side of the load line 10. The control grid 64 of the tube 62 is connected with the plate 56 of the amplifier tube 55.

Impedance means is provided to connect the cathodes of the tubes 55 and 62 with neutral. The impedance means illustrated is a voltage divider including resistances 32, 33 and 34 connected in series between the load line 10 and neutral 13. The amplifier tube 55 may be connected with the resistor 33 of the voltage divider by means of an adjustable contact 68 so that the resistor 33 serves as a potentiometer. The cathode 65 of the cathode follower tube 62 is shown connected to neutral through the adjustable contact 68 and through a resistor 69. This connection also gives D. C. regenerative feedback. In an alternative hookup the resistor 69 may be connected with the voltage divider through a connection 70 in which case the amount of regenerative feedback may be controlled by the variable resistor 34. If desired an impedance network such as that illustrated in Figure 1 may be used for uniform feedback over the range of the circuit. The regenerative feedback increases the gain of the circuit.

A secondary or auxiliary source of D. C. potential is provided to apply a suitable negative bias to the control grid 15 of the regulating means 11. This secondary source of D. C. may be a full wave rectifier 73 connected with a smoothing filter network 74 of any suitable construction, which is connected across the resistor 52 so that a negative potential with respect to neutral 13 is applied to the control grid 15 of the regulating tube 11. A resistance 75 is connected between the control grid 15 and the cathode 65 of the cathode follower tube 62 so that the voltage variations across the load are applied to the control grid. It will be observed that the auxiliary source of D. C. supply applies its voltage across the resistor 52. As connected there is a circuit for the auxiliary power supply parallel with the resistance 52 in the resistors 51, 75, 69, 33 and 34 to neutral 13. For this reason the resistors 51 and 75 are relatively high and preferably the resistor 75 has a value roughly about twice that of resistor 51. Although the current from the secondary or auxiliary D. C. supply bucks the current of the tube 62 through resistor 69, this current, however, is too small to have any material effect upon the operation of the tube 62. The secondary power supply may be connected with any suitable source of A. C. current through the transformer 76.

In the operation of the circuit of Figure 2, if it is assumed that the voltage across the load drops for any reason, this variation in voltage is applied to the control grid 57 of the amplifying tube 55. This results in a reduction of current flow through the tube and resistor 59 so that the voltage at the plate 56 of the tube rises. This increased potential is applied to the control grid 64 of the tube 62 so that it becomes more positive with respect to its cathode 65 and increased current flows through this tube. The increased current through the tube and hence through the resistor 69 raises the voltage of the cathode 65 and by virtue of the connection through resistor 75 with the control grid 15 of the regulator tube 11 raises the voltage of this control grid with respect to its cathode and thereby raises the voltage on the output side of the load line 10. In the event that the voltage applied to the load increases, the reverse operation takes place through the control circuit so that the control grid 15 of the regulator tube 11 becomes more negative with respect to its cathode and the potential on the output side of the regulator tube of the load circuit 10 is lowered.

With the secondary D. C. supply 73 the control grid 15 has a potential applied thereto which is negative with respect to the neutral 13 so that voltage variations are regulated over a voltage applied to the load ranging from zero to the maximum available from the power supply which may be several hundred volts.

In the circuits of Figures 1 and 2 the control grid 15 of the regulator tube or tubes 11 are connected to ground through resistive means which includes resistors 16, 17, 45 and 34 in the circuit of Figure 1 and resistors 51 and 52 as well as 75, 69, and 34 or 33 and 34 in the circuit of Figure 2. The secondary source of direct current potential is connected across at least some portion of this resistive means. The resistive means necessarily includes the resistance or resistances in the cathode circuit of the control means or tubes 38 and 62 since it is the voltage variations thereacross which is applied to the control grid of the regulator tube. It will be noted that in the circuit of Figure 1 that the resistance 16 across which the secondary potential is applied is in series with the cathode resistor or resistances of the control tube 38 whereas in the circuit of Figure 2, the resistance 52 across which the secondary voltage is applied is in parallel with the cathode resistor or resistors of the control tube 62.

This invention provides an improvement in a voltage regulator and D. C. feedback. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A regulating circuit for insertion in a load circuit carrying D. C. current comprising regulating means adapted to be connected in series in and form a part of the load circuit including at least one regulating electronic discharge tube, each having a plate, control grid and cathode; impedance means connecting the control grid to neutral, a secondary source of D. C. potential connected across at least a portion of said impedance means to apply a negative potential to the control grid of the regulating means; and a control circuit controlling the grid of the regulating discharge means in a direction opposite from that of the potential variations of the load circuit including means to amplify the variations in potential of the load circuit on the output side of the regulating discharge tube, means connected with the amplifying means and the control grid of the regulating means to present the amplified voltage variations of the load circuit to the control grid of the regulating means, and means to regeneratively feedback the voltage variations to the amplifying means.

2. A regulating circuit for insertion in a load circuit carrying D. C. current comprising regulating means adapted to be connected in series in and form a part of the load circuit including at least one regulating electronic discharge tube each having a plate, control grid and cathode, impedance means connecting the control grid to neutral, a source of D. C. potential connected to said impedance means to apply a negative potential to the control grid; a control circuit controlling the grids of the regulating discharge means including an amplifier tube having a plate, control grid and cathode, means connecting the control grid with the output side of the regulating discharge means, an impedance connecting the plate with a source of D. C. supply, a second control tube having a plate, control grid and cathode, a connection from the plate of the amplifier tube to the control grid of the second control tube, a connection from the cathode of the second control tube to the impedance means for the control grid of the regulating tube, and a connection from the plate of the second control tube to a source of D. C. supply.

3. A regulating circuit for insertion in a load circuit carrying D. C. current comprising regulating means adapted to be connected in series in and form a part of the load circuit including at least one regulating electronic discharge tube each having a plate, control grid and cathode, impedance means connecting the control grid to neutral, a source of D. C. potential connected to said impedance means to apply a negative potential to the control grid; a control circuit controlling the grids of the regulating discharge means including an amplifier tube having a plate, control grid and cathode, means connecting the control grid with the output side of the regulating discharge means, an impedance connecting the plate with a source of D. C. supply, a second control tube having a plate, control grid and cathode, a connection from the plate of the amplifier tube to the control grid of the second control tube, a connection from the cathode of the second control tube to the impedance means for the control grid of the regulating tube, a connection from the plate of the second control tube to a source of D. C. supply, and means connecting the cathodes of the two control tubes for D. C. feedback.

4. A regulating circuit for insertion in a load circuit carrying D. C. current comprising regulating means adapted to be connected in series in and form a part of the load circuit including at least one regulating electronic discharge tube each having a plate, control grid and cathode, impedance means connecting the control grid to neutral, a source of D. C. potential connected across at least a portion of said impedance means adjacent to the control grid to apply a negative potential thereto; a control circuit controlling the grid of the regulating discharge means including an amplifier tube having a plate, control grid and cathode, means connecting the control grid with the output side of the regulating discharge means, an impedance connecting the plate with a source of D. C. supply, a second control tube having a plate, control grid and cathode, a connection from the plate of the amplifier tube to the control grid of the second control tube, a connection from the cathode of the second control tube to the impedance means for the control grid of the regulating tube, and a connection from the plate of the second control tube to a source of D. C. supply.

5. A regulating circuit for insertion in a load circuit carrying D. C. current comprising regulating means adapted to be connected in series in and form a part of the load circuit including at least one regulating electronic discharge tube each having a plate, control grid and cathode, impedance means connecting the control grid to neutral, a source of D. C. potential connected across a portion of said impedance means adjacent to the control grid to apply a negative potential thereto; a control circuit controlling the grids of the regulating discharge means including an amplifier tube having a plate, control grid and cathode, means connecting the control grid with the output side of the regulating discharge means, an impedance connecting the plate with a source of D. C. supply, a second control tube having a plate, control grid and cathode, a connection from the plate of the amplifier tube to the control grid of the second control tube, a connection from the cathode of the second control tube to the impedance means for the control grid of the regulating tube, a connection from the plate of the second control tube to a source of D. C. supply, and means connecting together the cathodes of the two control tubes.

6. A regulating circuit for insertion in a load circuit carrying D. C. current comprising regulating means adapted to be connected in series in and form a part of the load circuit including at least one regulating electronic discharge tube each having a plate, control grid and cathode, impedance means connecting the control grid to neutral, a source of D. C. potential connected across a portion of said impedance means adjacent to the control grid to apply a negative potential thereto; a control circuit controlling the grids of the regulating means including an amplifier tube having a plate, control grid and cathode, means connecting the control grid with the output side of the regulating discharge means, an impedance connecting the plate with a source of D. C. supply, an impedance connecting the cathode to neutral, a second control tube having a plate, control grid and cathode, a connection from the plate of the amplifier tube to the control grid of the second control tube, a connection from the cathode of the second control tube to the impedance means for the control grid of the regulating tube, a connection from the plate of the second control tube to a source of D. C. supply; and an impedance network connecting the cathodes of the two control tubes together for D. C. feedback including a voltage divider connecting the load circuit with neutral, a resistance connecting a portion of the voltage divider with the cathode of the second control tube, a connection from the cathode of the amplifier tube to the voltage divider, and a resistance connecting together the cathodes of the two control tubes.

7. A regulating circuit for insertion in a load circuit carrying D. C. current comprising regulating means adapted to be connected in series in and form a part of the load circuit including at least one regulating electronic discharge tube each having a plate, control grid and cathode, impedance means connecting the control grid to neutral, a secondary source of D. C. potential connected across a portion of said impedance means to apply a negative potential to the control grid; a control circuit controlling the grids of the regulating means including an amplifier tube having a plate, control grid and cathode, means connecting the control grid with the output side of the regulating discharge means, an impedance connecting the plate with a source of D. C. supply, a second control tube having a plate, control grid and cathode, a connection from the plate of the amplifier tube to the control grid of the second control tube, a connection from the cathode of the second control tube to the impedance means for the control grid of the regulating tube, a connection from the plate of the second control tube to a source of D. C. supply; and an impedance network connecting the cathodes of the two control tubes together and with neutral for D. C. feedback including a voltage divider connecting the load circuit with neutral, an adjustable connection between the cathode of the amplifier tube and the voltage divider, and a resistance connecting together the cathodes of the two tubes of the control circuit.

8. A regulating circuit for insertion in a load circuit carrying D. C. current comprising regulating means adapted to be connected in series in and form a part of the load circuit including at least one regulating electronic discharge tube each having a plate, control grid and cathode, impedance means connecting the control grid to neutral, an auxiliary source of D. C. potential connected to said impedance means and to neutral to apply a negative potential to the control grid of the regulating means; a control circuit controlling the grids of the regulating means including an amplifier tube having a plate, control grid and cathode, means connecting the control grid with the output side of the regulating discharge means, an impedance connecting the plate with a source of D. C. supply, a second control tube having a plate, control grid and cathode, a connection from the plate of the amplifier tube to the control grid of the second control tube, a connection from the cathode of the second control tube to the impedance means for the control grid of the regulating tube, a connection from the plate of the second control tube to a source of D. C. supply, and resistance means connecting the cathodes of the two control tubes with neutral.

9. A regulating circuit for insertion in a load circuit carrying D. C. current comprising regulating means adapted to be connected in series in and form a part of the load circuit including at least one regulating electronic discharge tube each having a plate, control grid and cathode, impedance means connecting the control grid to neutral, an auxiliary source of D. C. potential connected to said impedance means and to neutral to apply a negative potential to the control grid of the regulating means; a control circuit controlling the grids of the regulating means including an amplifier tube having a plate, control grid and cathode, means connecting the control grid with the output side of the regulating discharge means, a resistance connecting the plate with a source of D. C. supply, a second control tube having a plate, control grid and cathode, a connection from the plate of the amplifier tube to the control grid of the second control tube, a connection from the cathode of the second control tube to the impedance means for the control grid of the regulating tube, and a connection from the plate of the second control tube to a source of D. C. supply; and resistance means connecting the cathodes of the two control tubes together and with neutral for D. C. feedback.

10. A regulating circuit for insertion in a load circuit carrying D. C. current comprising regulating means adapted to be connected in series in and form a part of the load circuit including at least one regulating electronic discharge tube each having a plate, control grid and cathode, impedance means connecting the control grid to neutral, a secondary source of D. C. potential connected across a portion of said impedance means to apply a negative potential to the control grid; a control circuit controlling the grids of the regulating means including an amplifier tube having a plate, control grid and cathode, means connecting the control grid with the output side of the regulating discharge means, a resistance connecting the plate with a source of D. C. supply, a second control tube having a plate, control grid and cathode, a connection from the plate of the amplifier tube to the control grid of the second control tube, a connection from the cathode of the second control tube to the impedance means for the control grid of the regulating tube, a connection from the plate of the second control tube to a source of D. C. supply; and a resistance network connecting the cathodes of the two control tubes together and with neutral for D. C. feedback including a voltage divider connecting the load circuit with neutral, an adjustable connection between the cathode of the amplifier tube and the voltage divider, a resistance connecting the second control grid with neutral, and a resistance connecting together the cathodes of the two tubes of the control circuit.

11. A regulating circuit for insertion in a load circuit carrying D. C. current comprising regulating means adapted to be connected in series in and form a part of the load circuit including at least one regulating electronic discharge tube each having a plate, control grid and cathode, impedance means connecting the control grid to neutral, a secondary source of D. C. potential connected across a portion of said impedance means to apply a negative potential to the control grid; a control circuit controlling the grids of the regulating means including an amplifier tube having a plate, control grid and cathode, means connecting the control grid with the output side of the regulating discharge means, a resistance connecting the plate with a source of D. C. supply, a second control tube having a plate, control grid and cathode, a connection from the plate of the amplifier tube to the control grid of the second control tube, a connection from the cathode of the second control tube to the impedance means for the control grid of the regulating tube, a connection from the plate of the second control tube to a source of D. C. supply; and a resistance network connecting the cathodes of the two control tubes together and with neutral for D. C. feedback including a voltage divider connecting the load circuit with neutral, an adjustable connection between the cathode of the amplifier tube and the voltage divider, a resistance connecting the cathode of the second control grid with neutral, a resistance connecting the cathode of the second control tube with the voltage divider at a point of lower potential thereon than the adjustable connection, and a resistance connecting together the cathodes of the two tubes of the control circuit.

12. A regulating circuit for insertion in a load circuit carrying direct current comprising regulating means adapted to be connected in series in and form a part of the load circuit including at least one regulating electronic discharge tube each having a plate, control grid and cathode, a control circuit connected with the control grid of the regulating tube for controlling the bias thereon including a control electronic discharge tube having a cathode, control grid, and plate, resistive means connecting the control grid of the regulating tube with neutral, and a secondary source of direct current potential connected across at least a portion of the resistive means in negative biasing relation with the control grid of the regulating tube.

13. A regulating circuit for insertion in a load circuit carrying direct current comprising regulating means adapted to be connected in series in and form a part of the load circuit including at least one regulating electronic discharge tube each having a plate, control grid and cathode, a control circuit connected with the control grid of the regulating tube for controlling the bias thereon including a control electronic discharge tube having a cathode, control grid, and plate, resistive means connecting the control grid of the regulating tube with neutral including at least one resistor between neutral and the cathode of the control tube, and a secondary source of direct current potential connected across at least a portion of the resistive means in negative biasing relation with the control grid of the regulating tube.

14. A regulating circuit for insertion in a load circuit carrying direct current comprising regulating means adapted to be connected in series in and form a part of the load circuit including at least one regulating electronic discharge tube each having a plate, control grid and cathode, a control circuit connected with the control grid of the regulating tube for controlling the bias thereon including a control electronic discharge tube having a cathode, control grid, and plate, resistive means connecting the control grid of the regulating tube with neutral including at least one resistor between neutral and the cathode of the control tube, and a secondary source of direct current potential connected across at least a portion of the resistive means in negative biasing relation with the control grid of the regulating tube including a transformer rectifier and filter.

15. A regulating circuit for insertion in a load circuit carrying direct current comprising regulating means adapted to be connected in series in and form a part of the load circuit including at least one regulating electronic discharge tube each having a plate, control grid and cathode; a control circuit connected with the control grid of the regulating tube for controlling the bias thereon including a control electronic discharge tube having a cathode, control grid, and plate, and an amplifier tube connected between the load circuit and the control tube; tube resistive means connecting the control grid of the regulating tube with neutral including at least one resistor between neutral and the cathode of the control tube and a secondary source of direct current potential connected across at least a portion of the resistive means in negative biasing relation with the control grid of the regulating tube.

16. A regulating circuit for insertion in a load circuit carrying direct current comprising regulating means adapted to be connected in series in and form a part of the load circuit including at least one regulating electronic discharge tube each having a plate, control grid and cathode; a control circuit for controlling the bias on the control grid of the regulating tube including a control electronic discharge tube having a cathode, control grid, and plate, an amplifier tube having a plate and connected between the load circuit and the cathode tube, and a resistance in the plate circuit of the amplifier tube; resistive means connecting the control grid of the regulating tube with neutral including at least one resistor between neutral and the cathode of the control tube, and a secondary source of direct current potential connected across at least a portion of the resistive means in negative biasing relation with the control grid of the regulating tube.

17. A regulating circuit for insertion in a load circuit carrying direct current comprising regulating means adapted to be connected in series in and form a part of the load circuit including at least one regulating electronic discharge tube each having a plate, control grid and cathode; a control circuit controlling the bias on the control grid of the regulating tube including amplifying means connected on the output side of the regulating means to amplify the voltage variations thereof, control means connected with the amplifying means and the control grid of the regulating tube to control the latter in a direction opposite from that of the potential variations of the load circuit, and a resistive means connecting the control grid of the regulating tube with neutral including a resistor in the control circuit; and a secondary source of direct current potential connected across at least a portion of the resistive means in negative biasing relation with the control grid of the regulating tube.

18. A regulating circuit for insertion in a load circuit carrying direct current comprising regulating means adapted to be connected in series in and form a part of the load circuit including at least one regulating electronic discharge tube each having a plate, control grid and cathode; a control circuit controlling the bias on the control grid of the regulating tube including an amplifier electronic discharge tube connected with the load circuit and having a plate, a resistance in series with the plate of amplifier tube, means connecting the amplifier tube to the control grid of the regulating tube to present the variations of load potential in opposite sense, and resistive means connecting the control grid of the regulating tube with neutral, tube having a plate connected between the load and a secondary source of direct current potential connected across at least a portion of the resistive means in negative biasing relation with the control grid of the regulating tube.

19. A regulating circuit for insertion in a load circuit carrying direct current comprising regulating means adapted to be connected in series in and form a part of the load circuit including at least one regulating electronic discharge tube each having a plate, control grid and cathode; a control circuit connected with the control grid of the regulating tube for controlling the bias thereon including a control electronic discharge tube having a cathode, control grid, and plate, an amplifier tube having a plate connected between the load circuit and the control tube, and a resistance in the plate circuit of the amplifier tube; at least one biasing resistor between neutral and the cathode of the control tube, a second resistor connecting the control grid of the regulating tube in series with the bias resistor, and a secondary source of direct current potential connected across at least a portion of the second resistor in negative biasing relation with the control grid of the regulating tube.

20. A regulating circuit for insertion in a load circuit carrying direct current comprising regulating means adapted to be connected in series in and form a part of the load circuit including at least one regulating electronic discharge tube each having a plate, control grid and cathode; a control circuit connected with the control grid of the regulating tube for controlling the bias thereon including a control electronic discharge tube having a cathode, control grid, and plate, an amplifier circuit and the control tube, and a resistance in the plate circuit of the amplifier tube; at least one biasing resistor between neutral and the cathode of the control tube, a connection between the cathode of the control tube and the control grid of the regulating tube, at least one second resistor connecting the control grid of the regulating tube with neutral and in parallel with the biasing resistor, and a secondary source of direct current potential connected across at least a portion of the second resistor in negative biasing relation with the control grid of the regulating tube.

LIONEL P. PARADISE.
WERNER F. AUERBACHER.

REFERENCES CITED

The following references are of record in the file of this patent:

UNITED STATES PATENTS

| Number | Name | Date |
| --- | --- | --- |
| 2,120,884 | Brown | June 14, 1938 |
| 2,203,004 | Wester | June 4, 1940 |
| 2,219,195 | Norgaard | Oct. 22, 1940 |
| 2,226,288 | Pieplow | Dec. 24, 1940 |
| 2,247,082 | Gardiner | June 24, 1941 |
| 2,299,942 | Trevor | Oct. 27, 1942 |

Certificate of Correction

Patent No. 2,484,724　　　　　　　　　　　　　　　　　　　October 11, 1949

LIONEL P. PARADISE ET AL.

It is hereby certified that errors appear in the printed specification of the above numbered patent requiring correction as follows:

Column 4, line 59, for the word "grain" read *gain*; line 71, after "connected" insert *directly*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*